United States Patent
Choi et al.

(10) Patent No.: US 10,104,627 B2
(45) Date of Patent: Oct. 16, 2018

(54) METHOD FOR PERFORMING UPLINK SYNCHRONIZATION IN WIRELESS COMMUNICATION SYSTEM AND APPARATUS THEREFOR

(71) Applicant: LG ELECTRONICS INC., Seoul (KR)

(72) Inventors: Kukheon Choi, Seoul (KR); Hyunsoo Ko, Seoul (KR); Kwangseok Noh, Seoul (KR); Dongkyu Kim, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 15/516,606

(22) PCT Filed: Feb. 23, 2016

(86) PCT No.: PCT/KR2016/001735
§ 371 (c)(1),
(2) Date: Apr. 3, 2017

(87) PCT Pub. No.: WO2016/153176
PCT Pub. Date: Sep. 29, 2016

(65) Prior Publication Data
US 2017/0303224 A1    Oct. 19, 2017

Related U.S. Application Data

(60) Provisional application No. 62/135,726, filed on Mar. 20, 2015.

(51) Int. Cl.
*H04B 7/00*    (2006.01)
*H04W 56/00*    (2009.01)
*H04W 74/08*    (2009.01)

(52) U.S. Cl.
CPC ... *H04W 56/0005* (2013.01); *H04W 74/0833* (2013.01)

(58) Field of Classification Search
USPC ............... 370/310.2, 328, 338, 334, 339
See application file for complete search history.

(56) References Cited

U.S. PATENT DOCUMENTS

| | | | |
|---|---|---|---|
| 2014/0003369 A1 | 1/2014 | Josiam et al. | |
| 2014/0120926 A1* | 5/2014 | Shin ............... | H04W 56/00 455/450 |
| 2015/0146631 A1* | 5/2015 | Kim ................ | H04W 74/0833 370/329 |

FOREIGN PATENT DOCUMENTS

| | | |
|---|---|---|
| JP | 2013-48461 A | 3/2013 |
| JP | 2014-126972 A | 7/2014 |

(Continued)

OTHER PUBLICATIONS

Jeong et al., "Random Access in Millimeter-Wave Beamforming Cellular Networks: Issues and Approaches," IEEE Communications Magazine, Jan. 2015, pp. 180-185.

*Primary Examiner* — Brenda H Pham
(74) *Attorney, Agent, or Firm* — Birch, Stewart, Kolasch & Birch, LLP (57) ABSTRACT

A method for performing uplink synchronization by a terminal in a millimeter wave (mmWave)-based wireless communication system according to an embodiment of the present invention comprises the steps of: repeatedly transmitting a first type random access preamble through a plurality of coarse beams that are sequentially formed for different directions; performing a first timing advance (TA) adjustment on the basis of a response of a base station with respect to a repeated transmission of the first type random access preamble; and transmitting a second type random access preamble through at least one fine beam having a (Continued)

smaller beam width than the coarse beams, wherein the sequence of the second type random access preamble transmitted after the first TA adjustment is configured to be shorter than the sequence of the first type random access preamble on the time axis.

16 Claims, 7 Drawing Sheets

(56) References Cited

FOREIGN PATENT DOCUMENTS

| | | |
|---|---|---|
| KR | 10-2013-0034827 A | 4/2013 |
| KR | 10-2013-0105706 A | 9/2013 |
| KR | 10-2014-0041765 A | 4/2014 |
| KR | 10-2014-0102278 A | 8/2014 |
| WO | WO 2014/113103 A1 | 7/2014 |
| WO | WO 2015/002465 A1 | 1/2015 |

* cited by examiner

Time taken for a UE having a specific beam width
to perform scanning in all directions
with respect to one beam direction of a base station

FIG. 3

Pilot transmission with determined Rx beam and
Tx beam determination

New type RACH preamble configuration for fine beam

METHOD FOR PERFORMING UPLINK SYNCHRONIZATION IN WIRELESS COMMUNICATION SYSTEM AND APPARATUS THEREFOR

CROSS REFERENCE TO RELATED APPLICATIONS

This application is the National Phase of PCT International Application No. PCT/KR2016/001735, filed on Feb. 23, 2016, which claims priority under 35 U.S.C. 119(e) to U.S. Provisional Application No. 62/135,726, filed on Mar. 20, 2015, all of which are hereby expressly incorporated by reference into the present application.

TECHNICAL FIELD

The present invention relates to a wireless communication system and, more specifically, to a method of transmitting and receiving a random access preamble for uplink synchronization in a millimeter wave (mmWave)-based wireless communication system and an apparatus therefor.

BACKGROUND ART

A wireless access system has been widely developed to provide various kinds of communication services such as voice and data. Generally, the wireless access system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

Recently, a mmWave-based wireless communication system having higher frequency properties than cellular systems has been studied. The mmWave-based wireless communication system requires a synchronization method in consideration of mmWave propagation properties.

DISCLOSURE

Technical Problem

An object of the present invention devised to solve the problem lies in a method through which a UE beamforms and transmits different types of random access preambles to hierarchically perform uplink synchronization in a mmWave-based wireless communication system It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method of performing uplink synchronization by a user equipment (UE) in a millimeter Wave (mmWave) based wireless communication system includes: repeatedly transmitting a first type random access preamble through a plurality of coarse beams sequentially formed in different directions; performing primary timing advance (TA) adjustment, based on a response of a base station to the repeated transmission of the first type random access preamble; and transmitting a second type random access preamble through at least one fine beam having a smaller beam width than the coarse beams, wherein a sequence of the second type random access preamble transmitted after the primary TA adjustment is configured to be shorter than a sequence of the first type random access preamble in a time domain.

In another aspect of the present invention, a UE performing uplink synchronization in a mmWave based wireless communication system includes: a transmitter for transmitting a mmWave signal; and a processor for controlling the transmitter, wherein the processor is configured to control the transmitter to repeatedly transmit a first type random access preamble through a plurality of coarse beams sequentially formed in different directions, to perform primary TA adjustment, based on a response of a base station to repeated transmission of the first type random access preamble and to transmit a second type random access preamble through at least one fine beam having a smaller beam width than the coarse beams, wherein a sequence of the second type random access preamble transmitted after primary TA adjustment is configured to be shorter than a sequence of the first type random access preamble in a time domain.

The first type random access preamble may be transmitted in a unit of subframe, and the second type random access preamble may be transmitted in a unit of predetermined symbol.

The sequence of the second type random access preamble may have a longer duration than a maximum channel delay spread of mmWave in the time domain, wherein a sum of durations of the second type random access preamble, a guard time (GT) and a cyclic prefix (CP) are set to be equal to or shorter than a duration of 2 symbols.

Spacing of subcarriers in which the second type random access preamble is transmitted may be set to a reciprocal of a duration of the second type random access preamble.

The second type random access preamble may satisfy a formula $N_{DFT}=f_s*T_{SEQ}$, where $N_{DFT}$ denotes a Discrete Fourier Transform (DFT) size, $f_s$ denotes a sampling frequency, and $T_{SEQ}$ denotes a duration of the second type random access preamble.

The UE may perform secondary TA adjustment, based on a response of the base station to the transmission of the second type random access preamble.

The UE may perform only the secondary TA adjustment again by transmitting the second type random access preamble when uplink asynchronization occurs due to communication path switching between Line of Sight (LoS) and non-LoS (NLoS).

The UE may receive, through Radio Resource Control (RRC) signaling, at least one of a number of transmission times of the first type random access preamble, a number of transmission times of the second type random access preamble and a second type random access preamble transmission periodicity.

Advantageous Effects

According to an embodiment of the present invention, an uplink synchronization process of a UE is hierarchically divided into a first type random access preamble transmission process for primary TA adjustment and a second type random access preamble transmission process for secondary TA adjustment, and thus uplink synchronization can be acquired more efficiently and correctly. Furthermore, the UE can rapidly adapt to synchronization timing variation by performing only the secondary TA adjustment process which is relatively short in a situation in which a LoS/NLoS communication path is frequently changed according to mmWave characteristics.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings. That is, unintended effects according to implementation of the present invention can also be derived by those skilled in the art from embodiments of the present invention.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may obscure the substance of the present invention, are not explained. In addition, procedures or steps, which can be understood by those skilled in the art, are not explained.

Throughout the specification, when it is said that some part "comprises or includes" a specific element, this means that the part may further include other elements, not excluding them, unless otherwise mentioned. The terms "-er(or)", "module", "portion" and "part" are used to signify a unit performing at least one function or operation. The unit can be realized in hardware, software, or in a combination thereof. In addition, as used herein, the singular forms "a", "an" and "the" are intended to include the plural forms as well, unless the context clearly indicates otherwise.

In the embodiments of the present invention, a description is given, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term "BS" may be replaced with the term "fixed station", "Node B", "eNode B (eNB)", "advanced base station (ABS)", "Access Point", etc.

In addition, the term "terminal" in embodiments of the present invention may be replaced with the term "user equipment (UE)", "mobile station (MS)", "mobile subscriber station (MSS)", "subscriber station (SS)", "mobile terminal", "advanced mobile station (AMS)", etc.

Further, a transmitting side refers to a fixed node and/or a moving node that provide data services and audio services and a receiving side refers to a fixed node and/or a moving node that receive the data services or audio services. Accordingly, a UE may be a transmitting side and a BS may be a receiving side on uplink. Similarly, a UE may be a receiving side and a BS may be a transmitting side on downlink.

The embodiments of the present invention can be supported by standard documents disclosed for at least one of IEEE 802.xx, 3rd Generation Partnership Project (3GPP), 3GPP LTE, and 3GPP2. Particularly, the embodiments of the present invention can be supported by documents 3GPP TS 36.211, 3GPP TS 36.212, 3GPP TS 36.213, 3GPP TS 36.321 and 3GPP TS 36.331. That is, steps or parts that are not described to clarify the technical features of the present invention can be supported by such documents. Further, all terms as set forth herein can be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

Specific terms used in the embodiments of the present invention are provided to aid in understanding of the present invention. These specific terms may be replaced with other terms within the scope and spirit of the present invention.

For example, a cellular system may refer to LTE or LTE-A and a mmWave system may refer to a system that supports mmWave in LTE or LTE-A. That is, the mmWave system refers to a wireless access system supporting mmWave characteristics. In the embodiments of the present invention, the term "ray" can refer to a unique signal or a cluster of unique signals, which is generated in a mmWave link when beamforming is not performed.

Hereinafter, 3GPP LTE/LTE-A will be described as an exemplary wireless access system that can be used in embodiments of the present invention.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc.

UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. For clarity, the embodiments of the present invention focus on 3GPP LTE/LTE-A. However, the embodiments of the present invention are applicable to IEEE 802.16e/m.

Random Access in LTE/LTE-A System

A random access procedure in LTE will be described first.

Figure 1:
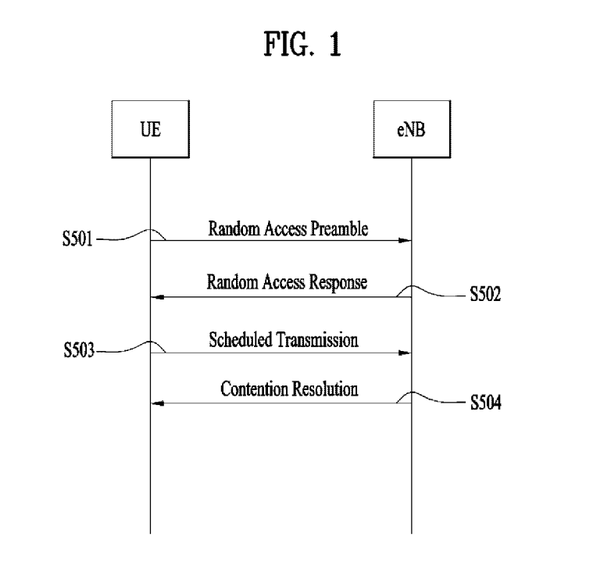
FIG. 1 illustrates a random access procedure of an LTE system.

FIG. 1 illustrates operations of a UE and an eNB in a contention-based random access procedure.

(1) Transmission of First Message

The UE may select a random access preamble randomly from a random preamble set indicated by system information or a handover command, select Physical Random Access CHannel (PRACH) resources, and transmit the random access preamble through selected Physical PRACH (PRACH) resources (S501).

(2) Reception of Second Message

After transmitting the random access preamble in step S501, the UE attempts to receive a random access response within a random access response reception window indicated through the system information or the handover command by the eNB (S502). To be more specific, the random access response may be transmitted in the form of a Medium Access Control Protocol Data Unit (MAC PDU) and the MAC PDU may be delivered over a Physical Downlink Shared CHannel (PDSCH). To receive information on the PDSCH successfully, the UE preferably monitors a Physical Downlink Control CHannel (PDCCH). That is, the PDCCH preferably carries information about a UE to receive the PDSCH, information about the frequency and time of radio resources of the PDSCH, and information about the transmission format of the PDSCH. Once the UE succeeds in receiving the PDCCH destined therefor, the UE may successfully receive a random access response over the PDSCH according to information carried over the PDCCH. The random access response may include an identifier (ID) of the random access preamble (e.g. a Random Access Preamble ID (RAPID)), an Uplink (UL) Grant indicating uplink radio resources, a temporary Cell-Radio Network Temporary Identify (C-RNTI), and a Timing Advance Command (TAC).

The reason for including the RAPID in the random access response is that because one random access response may contain random access response information for one or more UEs, it is necessary to indicate a UE to which the UL Grant, the temporary C-RNTI, and the TAC are valid. It is assumed in step S502 that the ID of the random access preamble is identical to the RAPID included in the random access response. Thus, the UE may receive the UL Grant, the temporary C-RNTI, and the TAC.

(3) Transmission of Third Message

Upon receipt of a valid random access response, the UE processes information included in the random access response. That is, the UE applies the TAC and stores the temporary C-RNTI. In addition, the UE may store data to be transmitted in a message3 buffer in correspondence with the reception of a valid random access response.

Meanwhile, the UE transmits data (i.e. a third message) to the eNB using the received UL Grant (S503). The third message should include an ID of the UE. In the contention-based random access procedure, the eNB cannot identify UEs that perform the random access procedure. However, the eNB should identify the UEs to avoid later-collision among them.

Two methods have been discussed to include the ID of the UE in the third message. One of the methods is that if the UE has a valid C-RNTI allocated by the cell before the random access procedure, the UE transmits its C-RNTI in an uplink signal corresponding to the UL Grant. On the other hand, if a valid C-RNTI has not been allocated to the UE before the random access procedure, the UE transmits its UE ID (e.g. S-TMSI or a random ID) in data. In general, the UE ID is longer than the C-RNTI. If the UE transmits data corresponding to the UL Grant, the UE activates a Contention Resolution (CR) timer to avoid contention.

(4) Reception of Fourth Message

After transmitting its ID in data according to the UL Grant included in the random access response, the UE awaits reception of a command for contention resolution from the eNB. That is, the UE attempts to receive a PDCCH in order to receive a specific message (S504). For PDCCH reception, two methods may be considered. When the third message is transmitted using the C-RNTI according to the UL Grant as described above, the UE attempts to receive a PDCCH using the C-RNTI. If the ID included in the third message is the UE ID, the UE may attempt to receive a PDCCH using the temporary C-RNTI included in the random access preamble. In the former case, if the UE receives a PDCCH using the C-RNTI before expiration of the CR timer, the UE ends the random access procedure, determining that the random access procedure has been performed normally. In the latter case, if the UE receives a PDCCH using the temporary C-RNTI before expiration of the CR timer, the UE checks data received on a PDSCH indicated by the PDCCH. If the data includes its UE ID, the UE ends the random access procedure, determining that the random access procedure has been performed normally. Meanwhile, a contention free random access procedure is ended only by transmitting first and second messages, which is different from the contention-based random access procedure shown in FIG. 5. However, the UE is allocated a random access preamble by the eNB before it transmits a random access preamble as the first message to the eNB. The UE transmits the allocated random access preamble as the first message to the eNB, and ends the random access procedure by receiving a random access response from the eNB.

Meanwhile, a contention free random access procedure is ended only by transmitting first and second messages, which is different from the contention-based random access procedure shown in FIG. 5. However, the UE is allocated a random access preamble by the eNB before it transmits a random access preamble as the first message to the eNB. The UE transmits the allocated random access preamble as the first message to the eNB, and ends the random access procedure by receiving a random access response from the eNB.

mmWave Beam Scanning

Hereinafter, mmWave beam scanning methods will be briefly described.

Figure 2:
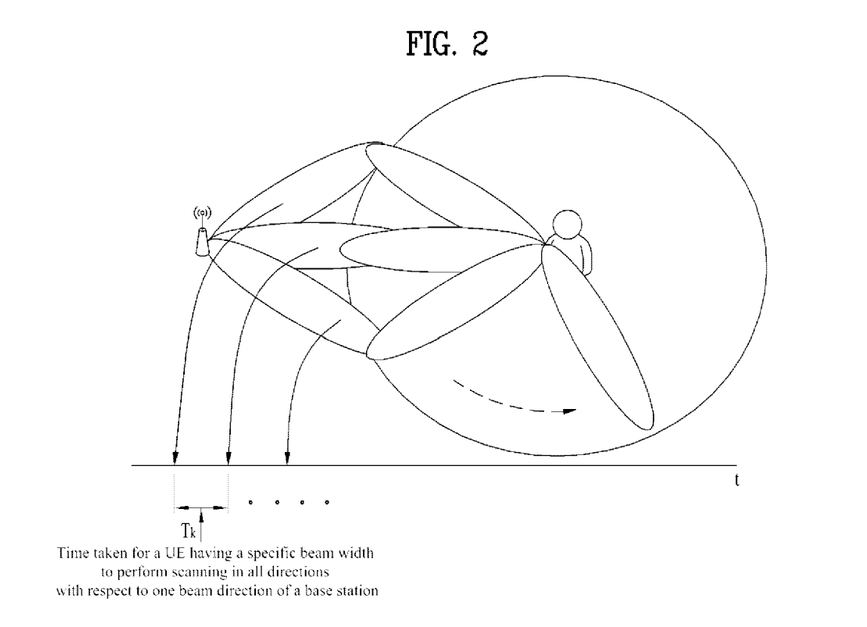
FIG. 2 illustrates an initial stage of reception beam scanning for transmission beam scanning according to an embodiment of the present invention.
Figure 3:
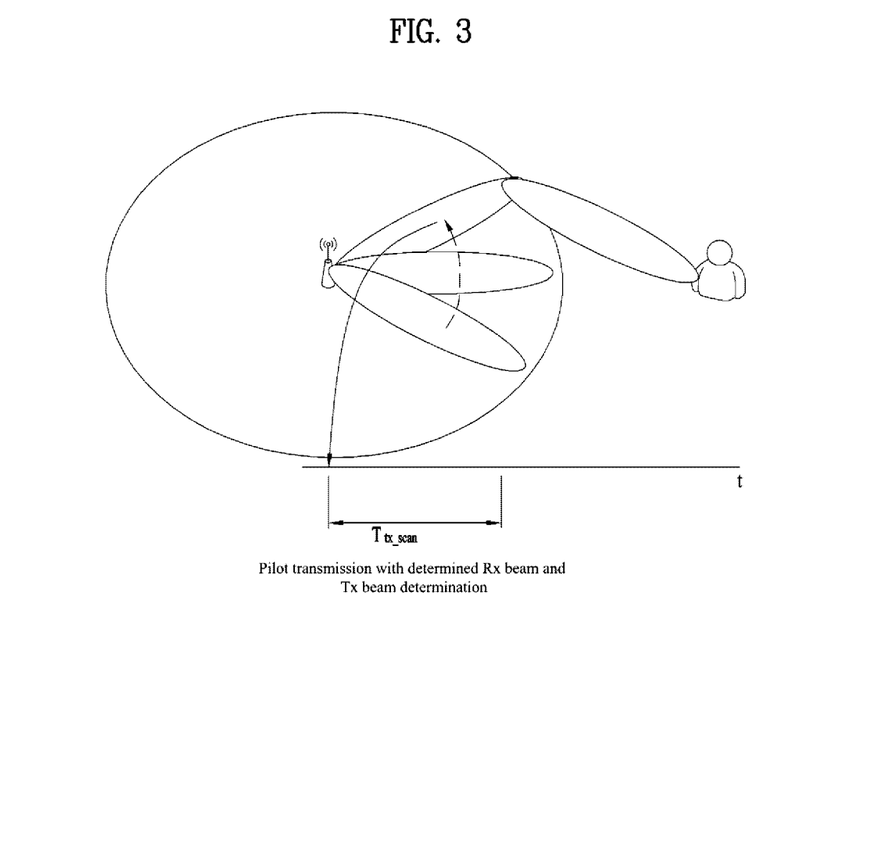
FIG. 3 illustrates a method of performing beam scanning at a transmitting side after a reception lobe index is fixed at a receiving side according to an embodiment of the present invention.

FIG. 2 illustrates an initial stage of reception beam scanning for transmission beam scanning according to an embodiment of the present invention and FIG. 3 illustrates a method of performing beam scanning at a transmitting side after a reception lobe index is fixed at a receiving side.

When a transmission beam codebook of a base station is determined in an initial stage of beam scanning, a receiving side, that is, a UE detects a power delay profile (PDP) according to each beam while performing 360-degree reception beam scanning with the corresponding transmission beam fixed. Here, the UE selects the index of a reception lobe having a ray with highest power from among detected PDPs. A lobe refers to each radiation group when energy of radiation from an antenna is distributed in multiple directions. That is, a lobe refers to a form of beam in beam scanning.

Formula 1 is used to calculate an SNR of each lobe detected by the UE.

$$\underset{i}{\operatorname{argmax}} |H_i^{(k)} w_i|^2 \frac{p_i^2}{\sigma_n^2} \qquad \text{[Formula 1]}$$

In Formula 1, $H_i^{(k)}$ denotes a radio channel of an i-th lobe with respect to a transmission beam k, $w_i$ denotes a precoding matrix, $p_i$ indicates received power, $\sigma$ indicates a noise level, and the square of $\sigma$ indicates noise power.

When a time when reception beam scanning for a fixed transmission beam lobe is completed is defined as $\tau_k$, as illustrated in FIG. 3, $\tau_k$ may be determined by Formula 2.

$$\tau_k = N(\tau_{excess\_delay} + \tau_{prop\_delay} + \tau_{process\_delay}) \qquad \text{[Formula 2]}$$

In Formula 2, $\tau_{exess\_delay}$ is an excess delay spread value that refers to a maximum delay time necessary for repeated beam scanning at a receiving side $\tau_{prop\_delay}$ is a transmission delay value, $\tau_{process\_delay}$ denotes a PDP measurement time and a strong ray detection time with respect to each reception beam lobe, and N indicates the number of beam lobes of the receiving side.

The receiving side repeats the aforementioned process while changing transmission beam lobes 1 to K 360 degrees. Accordingly, the beam scanning completion time of the receiving side is $K\tau_k$. Here, K indicates a total number of transmission beams.

Referring to FIG. 3, when the receiving side, a UE, completes beam scanning, the UE transmits a pilot signal to a mmWave base station. Then, the UE performs 360-degree beam scanning in order to determine a lobe index of a transmitting side. Accordingly, the transmission/reception beam scanning completion time becomes $K\tau_i + \tau_{tx\_scan}$.

In the following table 1, parameters for beam scanning completion time measurement are defined.

TABLE 1

| | |
|---|---|
| $\tau_{excess\_delay}$ | 1 μs |
| $\tau_{prop\_delay}$ | 5 μs |
| $\tau_{process\_delay}$ | 670 μs |
| N (beamwidth = 36 degree) | 100 (vertical + horizontal) |
| K (beamwidth = 36 degree) | 100 (vertical + horizontal) |
| $\tau_{tx\_scan}$ | 100*670 μs |

If parameters for beam scanning are defined as shown in Table 1, the transmission/reception beam scanning time amounts to 100*100*(1+5+670)+100*670=6.827 seconds. That is, overhead of a considerably long time is generated.

However, channel characteristics vary according to instantaneous movement of a user within a cell coverage due to mmWave properties. If about 7 seconds are taken for beam scanning, it is impossible to provide mmWave services suited to changed channel characteristics. Accordingly, a simpler processing method is required for mmWave link connection through normal beam scanning.

Figure 4:
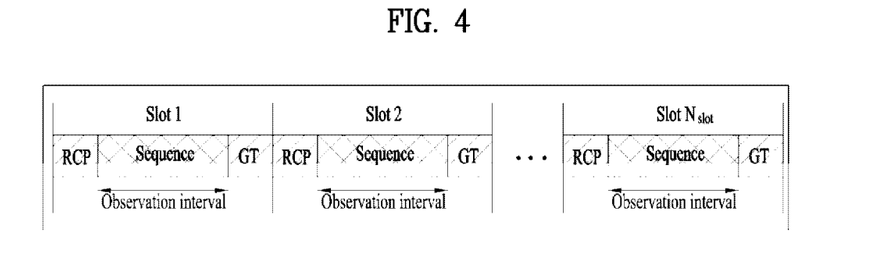
FIG. 4 illustrates a structure of a random access preamble repeated in a beam direction according to an embodiment of the present invention.

FIG. 4 illustrates a structure of a random access preamble repeated in a beam direction according to an embodiment of the present invention.

$N_{Slot}$ PRACH preambles are needed in $N_{Slot}$ beam directions during beam scanning. When a time advance (TA) is adjusted, however, a UE can gain an opportunity to transmit a PRACH preamble for synchronization per beam direction without considering an RTT and thus the duration of each preamble can be reduced.

Figure 5:
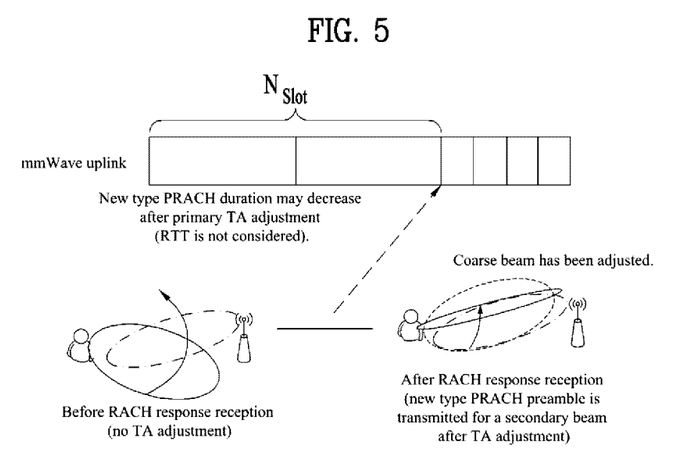
FIG. 5 illustrates use of a new type PRACH preamble according to an embodiment of the present invention.

FIG. 5 illustrates use of a new type of PRACH preamble according to an embodiment of the present invention.

When a TA is previously adjusted to a coarse beam in a mmWave transmission/reception beam pair, as illustrated in FIG. 5, an RTT need not be considered in PACH preamble transmission corresponding thereto. Accordingly, RACH overhead can be reduced. Overhead can be decreased by transmitting a preamble for the second TA, which corresponds to a symbol duration.

Figure 6:
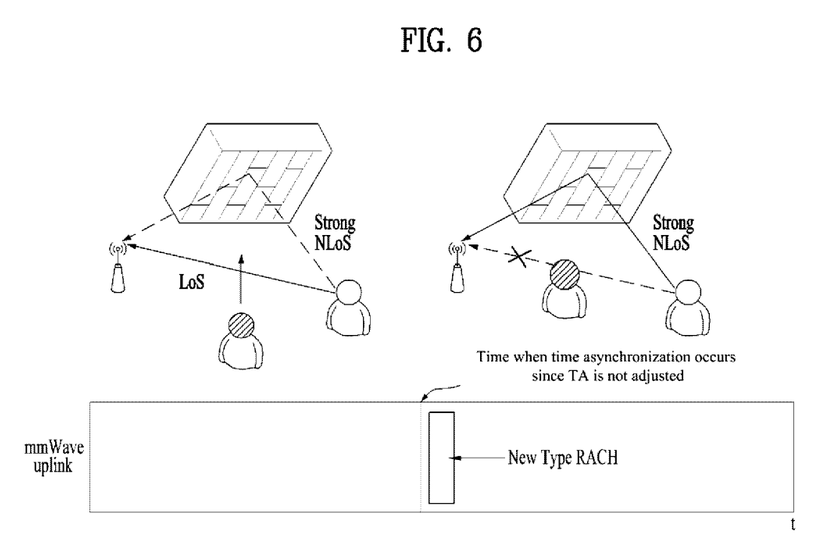
FIG. 6 illustrates use of the new type PRACH preamble according to another embodiment of the present invention.

FIG. 6 illustrates use of the new type PRACH preamble according to another embodiment of the present invention.

When an LoS (line of sight) link is suddenly disconnected due to abrupt appearance of an obstacle while a mmWave uplink is connected, if an NLoS (non-line of sight) link more robust than the LoS link is available between a UE and a base station, connection can be maintained through the NLoS.

Here, mmWave uplink performance can be enhanced only when synchronization of the robust NLoS line is acquired. Since a TA of a UE is set through an LoS link at present, a new type of PRACH preamble is required to correct asynchronization generated due to switching to NLoS. For example, NLoS excess delay may be about 1.4 μs in big cities.

If an NLoS link having a delay of 1.3 μs is used and a TA is not adjusted in a mmWave frame structure having a symbol duration of 10.9 μs, a CP may exceed 0.5 μs. Accordingly, it is necessary to adjust $\Delta_{TA}$ synchronization to the changed NLoS link. In addition, transmission is performed on the basis of the NLoS link even when an NLoS cluster enters the CP. Accordingly, this new type RACH preamble can be used even in an environment having little CP if $\Delta_{TA}$ is corrected.

Hereinafter, design of the new type RACH preamble for adjusting $\Delta_{TA}$ generated when a fine beam is adjusted and $\Delta_{TA}$ is adjusted depending thereon when transmission/reception beams of a mmWave link have been aligned, an NLoS link is used because an LoS link is cut when a beam has been aligned, or the NLoS link is switched to the LoS link, and a process of transmitting the preamble will be described.

The following is assumed. (i) A mmWave base station and a mmWave UE have capabilities of connecting a robust NLoS link. (ii) Abrupt NLoS link use due to mmWave link instability caused by LoS/NLoS switching, human obstacle, human body impact and the like is possible. (iii) A mmWave system can consider new waveform transmission without CP due to 10 ns RMS delay spread as well as OFDM based transmission.

New Type RACH Preamble

To design a new type RACH preamble sequence periodicity, the following conditions need to be satisfied. A sequence duration of a preamble is referred to as $T_{SEQ}$.

(1) Lower Bound

Detection ambiguity can be prevented only when the lower bound of $T_{SEQ}$ is longer than a maximum channel delay spread. That is, Formula 3 needs to be satisfied.

$$T_{SEQ} \geq \tau_{max} \qquad \text{[Formula 3]}$$

For example, $T_{SEQ} \geq 1.3$ μs needs to be satisfied in the mmWave system. The preamble needs to be transmitted in units of symbol corresponding to a minimum transmission unit because the lower bound of $T_{SEQ}$ is shorter than a mmWave symbol duration of 10.9 μs.

(2) Upper Bound

When a maximum periodicity of $T_{SEQ}$ is determined on the basis of a frame size, $T_{SEQ}$ cannot exceed a set TTI. That is, if a mmWave subframe is 222 μs, the TTI is 222 μs. Further, when use of the new type RACH preamble for the NLoS link in LoS is considered and a primary TA has been previously adjusted, one symbol is configured to cover all delay spreads in the frame size and thus the duration of one symbol can sufficiently cover the duration of the preamble. In addition, it is desirable to set the preamble duration within the duration of one symbol in order to minimize overhead of the new type RACH preamble.

For example, the duration of the RACH preamble can be set to be shorter than 10.9 μs. When NLoS to LoS link switching is considered, a decreased propagation delay needs to be corrected through time delay (TD). Accordingly, in consideration of these two facts, the preamble duration and a synchronization timing criterion can be determined using two consecutive symbols. Here, a guard time (guard time) and a cyclic prefix (CP) are necessary for correct RACH detection. The duration of the new type RACH preamble needs to be designed to be shorter than 21.8 μs including a CP and a GT when two consecutive symbols are used. Accordingly, the following Formula 4 needs to be satisfied.

$$T_{SEQ} + T_{CP} + T_{GT} \leq 2T_{symbol} \qquad \text{[Formula 4]}$$

For example, $T_{SEQ}$ can be set to be shorter than 19.2 μs (=21.8 μs−1.3 μs−1.3 μs) in the case of a high frequency carrier.

(3) Subcarrier-Spacing Compatibility

Maximum orthogonality between an uplink transmission subcarrier and a RACH transmission subcarrier of the legacy frame can be secured only when $T_{SEQ}$ and a sampling frequency $f_s$ are in a relationship of $N_{DFT} = f_s * T_{SEQ}$. $N_{DFT}$ refers to a DFT size.

RACH subcarrier spacing $\Delta f_{RA}$ needs to be an integer multiple of subcarrier spacing $\Delta f$ of the legacy frame. Accordingly, the following Formula 5 needs to be satisfied.

$$\Delta f_{RA} = \frac{f_s}{N_{DFT}} = \frac{1}{T_{SEQ}} = \frac{1}{k \cdot T_{SYM}} = \frac{\Delta f}{k} \qquad \text{[Formula 5]}$$

In the case of LTE, Formula 5 can be expressed by the following Formula 6.

$$\Delta f_{RA} = \qquad \text{[Formula 6]}$$
$$\frac{30.72 \text{ MHz}}{2048} = \frac{1}{800 us} = \frac{1}{12 \cdot 66.67 us} = \frac{15 \text{ kHz}}{12} = 1.25 \text{ kHz}$$

(4) Example of Setting RACH Preamble Periodicity of High Frequency Band Transmission An example of setting a RACH preamble periodicity for high frequency band transmission, which satisfies the above Formulas 3, 4 and 5, is proposed. Table 2 shows calculated values for determining the RACH preamble periodicity and CP. In Table 2, the maximum delay spread is assumed to be 1.3 μs.

TABLE 2

| GT (RTT is not necessary) | CP for RACH (1.3 μs) | GT + CP | 2 x symbol candidate $2T_{symbol}$ | $2T_{symbol}$ − (GT + CP) Sequence |
|---|---|---|---|---|
| 1.3 μs | 1.3 μs | 2.6 μs | 21.8 μs | 19.2 μs |

Formula 7 expresses values calculated on the basis of Table 2.

$$k = \Delta f / \Delta f_{RA} = 18 \leq \lfloor T_{SEQ}/T_{SYM} \rfloor = \lfloor 19.2 \text{ us}/(1/104.25 \text{ kHz}) \rfloor$$
$$\rfloor = 2$$

$$\Delta f_{RA} = \Delta f/k = 104.24 \text{ kHz}/2 = 52.12 \text{ kHz}$$

$$T_{SEQ} = 1/\Delta f_{RA} = 19.186 \text{ us}$$

$$T_{CP} = 1.3 \text{ us} \qquad \text{[Formula 7]}$$

When $T_{SEQ}=19.18$ μs derived by the Formula 7 is applied to Formulas 3, 4 and 5, Formula 8 is obtained.

$$T_{SEQ}=19.18 \text{ us} \geq 1.3 \text{ us which satisfies Formula 3}$$

$$T_{SEQ}=1918 \text{ us} \leq 2 \times T_{symbol}=192 \text{ us which satisfies Formula 4}$$

$$\Delta f_{RA} = \Delta f/k = 104.24 \text{ kHz}/2 = 52.125 \text{ kHz which satisfies Formula 5} \qquad \text{[Formula 8]}$$

Figure 7:
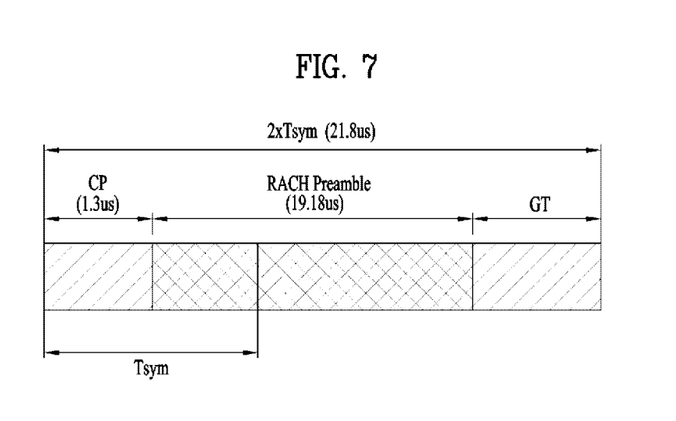
FIG. 7 illustrates a RACH preamble CP and periodicity configuration for high frequency band transmission according to an embodiment of the present invention.

Accordingly, the final RACH preamble structure can be represented by FIG. 7. FIG. 7 illustrates a RACH preamble CP and periodicity configuration for high frequency band transmission according to an embodiment of the present invention. In FIG. 7, a symbol duration is assumed to be 10.9 μs.

Figure 8:
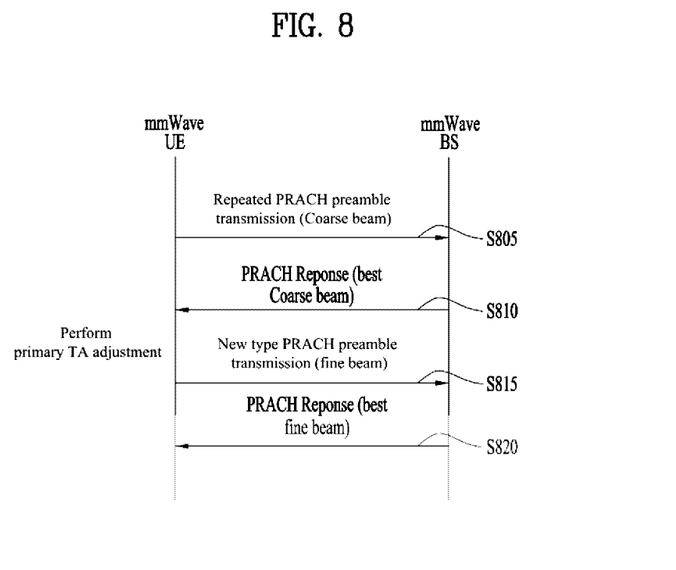
FIG. 8 illustrates transmission of a new type RACH according to an embodiment of the present invention.

FIG. 8 illustrates transmission of the new type RACH preamble according to an embodiment of the present invention. In the present embodiment, the new type RACH preamble is used for synchronization for fine beams. Accordingly, the new type RACH preamble can be used after adjustment of a TA of mmWave uplink for coarse beams.

Referring to FIG. 8, a UE repeatedly transmits a PRACH preamble (S805). Repeated transmission of the PRACH preamble is training for coarse beams formed in different directions in order to detect a coarse beam having maximum gain. A pattern of the RACH preamble defined in LTE/LTE-A can be used for the PRACH preamble transmitted for a coarse beam.

The UE receives a PRACH response from a base station (S810). The PRACH response may be for a best coarse beam having a maximum beamforming gain. The UE performs primary TA correction for the best coarse beam on the basis of the PRACH response.

When the UE is primarily adjusted to the best coarse beam in this way, the UE can transmit the aforementioned new type RACH preamble (S815). The new type RACH preamble can be transmitted for secondary TA acquisition for a fine beam.

The UE receives a PRACH response from the base station (S820). The PRACH response is a response for a best fine beam and the UE performs secondary TA correction on the basis of the PRACH response.

While FIG. 8 shows the RACH preamble for a coarse beam and the new type RACH preamble for a fine beam in consecutive procedures, the present invention is not limited thereto. As different embodiments in which the new type RACH preamble for a fine beam is transmitted, the new type RACH preamble may be transmitted in a shorter periodicity than the existing RACH transmission periodicity in order to acquire timing synchronization when LoS to NLoS link switching occurs or when NLoS to LoS link switching occurs.

The number of times of repeated transmission of the preamble for a coarse beam of a UE can be preset by mmWave RRC information. In addition, the number of times of transmission of the new type RACH preamble for a fine beam can also be preset by the mmWave RRC information.

Figure 10:
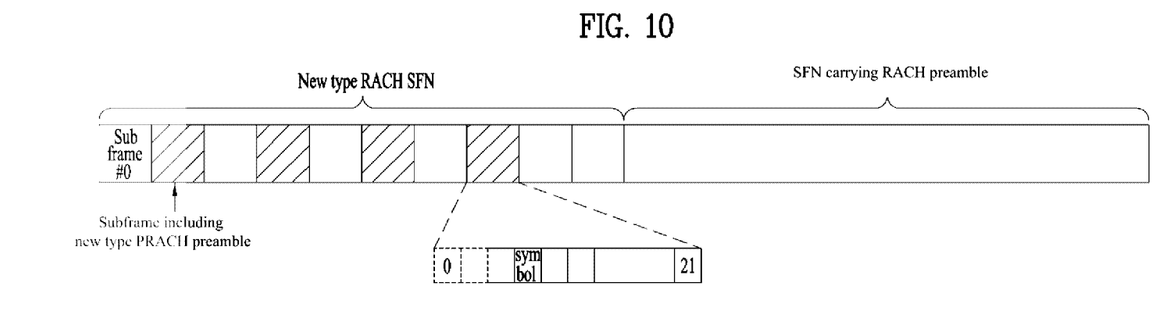
FIG. 10 illustrates a frame structure in which the new type PRACH preamble transmission with respect to a fine beam is configured according to another embodiment of the present invention.

FIG. 10 illustrates a frame structure in which transmission of the new type PRACH preamble for a fine beam is configured according to another embodiment of the present invention. In the present embodiment, the PRACH preamble for a coarse beam and the new type PRACH preamble for a fine beam are configured in different SFNs. A UE periodically transmits the new type RACH preamble for a fine beam in SFNs other than SFNs in which the PRACH preamble for a coarse beam is transmitted.

The RACH preamble transmission pattern shown in FIG. 10 can be used for the UE to detect TA variation and to acquire synchronization when abrupt LoS to NLoS link switching or abrupt NLoS to LoS link switching occurs. The new type PRACH transmission periodicity can be previously provided through mmWave RRC configuration in consideration of overhead.

Table 3 shows LTE PRACH configuration indexes (e.g., LTE PRACH configuration index 0) and new type PRACH configuration indexes.

TABLE 3

| PRACH Config.Index | Preamble Format | System frame number | Subframe number | New type PRACH config.index | New type PRACH system frame number | New type PRACH subframe number | New Type PRACH symbols number (bunch of 2 symbols) |
|---|---|---|---|---|---|---|---|
| 0 | 0 | even | 1 | 0 | even | N + 1 (N: coarse beam number) | {0, 1} |
|  |  |  |  | 1 | even | N + 1 | {2, 3} |
|  |  |  |  | 2 | even | N + 1 | {4, 5} |
|  |  |  |  | 3 | even | N + 1 | {6, 7} |
|  |  |  |  | 4 | even | N + 1 | {7, 8} |
|  |  |  |  | 5 | even | N + 1 | (9, 10} |
|  |  |  |  | 6 | even | N + 1 | {11, 12} |
|  |  |  |  | 7 | even | N + 1 | {13, 14} |
|  |  |  |  | 8 | even | N + 1 | {15, 16} |
|  |  |  |  | 9 | even | N + 1 | {17, 18} |
|  |  |  |  | 10 | even | N + 1 | {19,20} |
|  |  |  |  | 11 | even | N + 1 | {21, 22} |
|  |  |  |  | 12 | odd | 0, 2, 4, 6, 8 | {0, 1) |
|  |  |  |  | 13 | odd | 1, 3, 5, 7, 9 | {0, 1) |
|  |  |  |  | 14 | odd | 0, 3, 6, 9 | {0, 1) |
|  |  |  |  | 15 | odd | 1, 4, 7 | {0, 1) |

The new type PRACH preamble for a fine beam may be transmitted independently or in a form of being mixed with the PRACH preamble for a coarse beam.

Figure 9:
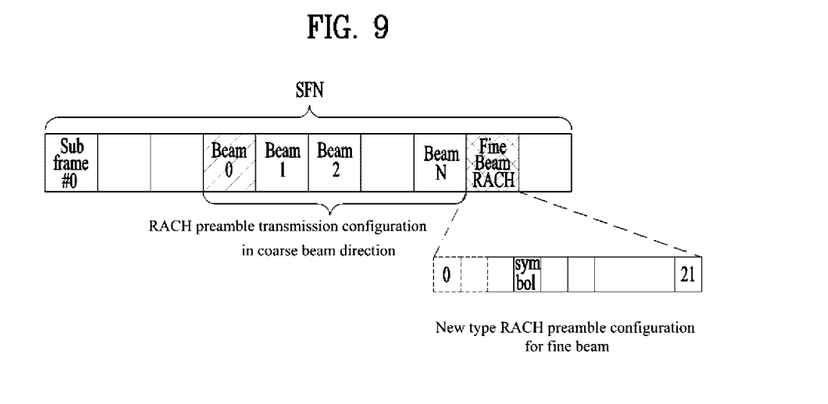
FIG. 9 illustrates a frame structure in which the new type PRACH preamble transmission with respect to a fine beam is configured according to an embodiment of the present invention.

FIG. 9 illustrates a frame structure in which transmission of the new type PRACH preamble for a fine beam is configured according to an embodiment of the present invention. In the present embodiment, the PRACH preamble for a coarse beam and the new type PRACH preamble for a fine beam are configured together in one SFN.

Referring to FIG. 9, it is assumed that a unit TTI has 22 symbols in a system frame configuration. When repeated RACH preamble transmission configuration in a mmWave coarse beam direction is determined as illustrated in FIG. 9, transmission of the new type preamble for a fine beam can be configured in the following subframe.

Referring to Table 3, new type PRACH preamble configuration indexes 0 to 11 show new type RACH preamble configurations for a fine beam and indexes 12 to 15 are used for periodic transmission for correction of time misalignment occurring due to LoS to NLoS switching, NLoS to LoS switching or instability caused by link sensitivity.

Figure 11:
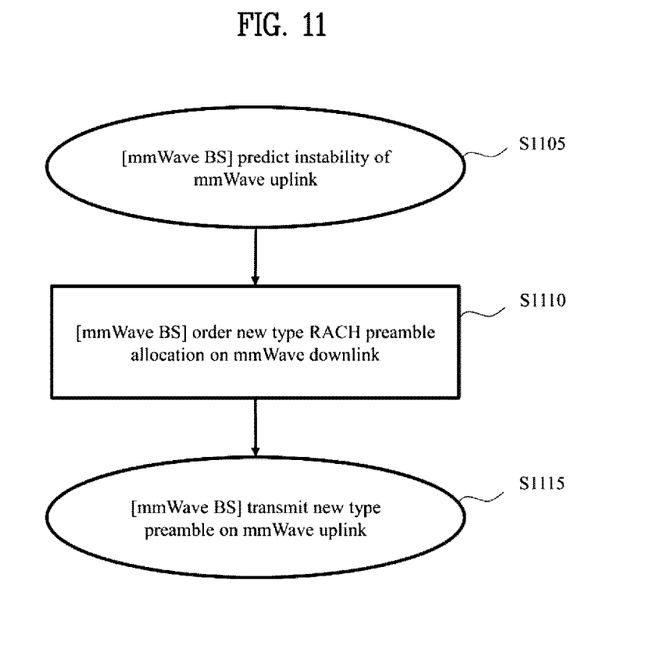
FIG. 11 illustrates a method of transmitting a PRACH preamble according to an embodiment of the present invention.

FIG. 11 illustrates a method of transmitting a PRACH preamble according to an embodiment of the present invention. According to the present embodiment, a UE can transmit the new type PRACH preamble based on demand.

A base station predicts instability of a mmWave uplink (S1105). For example, the base station detects a reference signal that senses abrupt radio link failure on uplink.

The base station orders transmission of the new type RACH preamble through a mmWave downlink (S1110). For example, the base station can preset a preamble to be transmitted by each UE, as in a non-contention-based RACH procedure, to avoid collision between preambles.

The UE transmits the corresponding RACH preamble in a demanded RACH allocation region (S1115). The base station transmits a response to the RACH preamble and the UE corrects uplink synchronization through the response.

Figure 12:
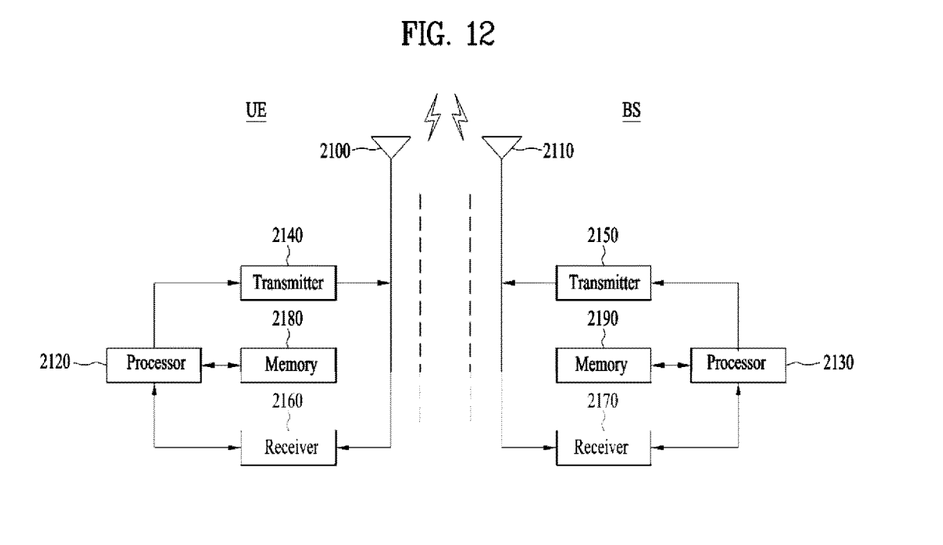
FIG. 12 illustrates a UE and a base station according to an embodiment of the present invention.

FIG. 12 illustrates a UE and a base station according to an embodiment of the present invention. The UE and the base station illustrated in FIG. 12 can perform the above-described embodiments.

The UE may serve as a transmitter on uplink and serve as a receiver on downlink. The base station may serve as a receiver on uplink and serve as a transmitter on downlink.

That is, the UE and the base station may respectively include Tx modules 2140 and 2150m and Rx modules 2150 and 2170 for controlling transmission and reception of information, data and/or messages, and antennas 2100 and 2110 for transmitting and receiving information, data and/or messages.

In addition, the UE and the base station may respectively include processors 2120 and 2130 for performing the above-described embodiments and memories 2180 and 2190 for temporarily or continuously storing processing results of the processors.

The embodiments of the present invention can be performed using the components and functions of the UE and the base station.

The transmission modules and the reception modules included in the UE and the base station can perform packet modulation and demodulation functions for data transmission, a fast packet channel coding function, orthogonal frequency division multiple access (OFDMA) packet scheduling, time division duplex (TDD) packet scheduling and/or channel multiplexing. Further, the UE and the base station illustrated in FIG. 12 may further include a low power radio frequency (RF)/intermediate frequency (IF) module.

In the present invention, a personal digital assistant (PDA), a cellular phone, a personal communication service (PCS) phone, a global system for mobile (GSM) phone, a wideband CDMA (WCDMA) phone, a mobile broadband system (MBS) phone, a handheld PC, a notebook PC, a smartphone, a multi-mode multi-band (MM-MB) terminal or the like may be used as the UE.

Here, the smartphone is a terminal having advantages of a mobile communication terminal and a personal portable terminal and may refer to a terminal configured in such a manner that a data communication function such as schedule management, facsimile transmission/reception and Internet access are integrated into a mobile communication terminal. The MM-MB terminal refers to a terminal including a multi-modem chip to operate in a mobile Internet system and other mobile communication systems (e.g., CDMA (Code Division Multiple Access) 2000 system, WCDMA (Wideband CDMA) system, etc.).

The embodiments of the present invention may be achieved by various means, for example, hardware, firmware, software, or a combination thereof.

In a hardware configuration, the methods according to the embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be implemented in the form of a module, a procedure, a function, etc. For example, software code may be stored in the memory unit 2180 and 2190 and executed by the processor 2120 and 2130. The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention are applicable to various wireless access systems. Examples of various wireless access systems include 3GPP (3rd Generation Partnership Project), 3GPP2 and IEEE 802.xx (Institute of Electrical and Electronic Engineers 802). The embodiments of the present invention can be applied to not only the various wireless access systems but also to all technical fields employing the various wireless access systems.

The invention claimed is:

1. A method of performing uplink synchronization by a user equipment (UE) in a millimeter Wave (mmWave) based wireless communication system, the method comprising:
   repeatedly transmitting a first type random access preamble through a plurality of coarse beams sequentially formed in different directions;
   performing primary timing advance (TA) adjustment, based on a response of a base station to the repeated transmission of the first type random access preamble; and
   transmitting a second type random access preamble through at least one fine beam having a smaller beam width than the coarse beams,
   wherein a sequence of the second type random access preamble transmitted after the primary TA adjustment is configured to be shorter than a sequence of the first type random access preamble in a time domain.

2. The method according to claim 1, wherein the first type random access preamble is transmitted in a unit of a subframe, and the second type random access preamble is transmitted in a unit of a predetermined symbol.

3. The method according to claim 1,
   wherein the sequence of the second type random access preamble has a longer duration than a maximum channel delay spread of a mmWave in the time domain, and
   wherein a sum of durations of the second type random access preamble, a guard time (GT) and a cyclic prefix (CP) are set to be equal to or shorter than a duration of 2 symbols.

4. The method according to claim 1, wherein spacing of subcarriers in which the second type random access preamble is transmitted is set to a reciprocal of a duration of the second type random access preamble.

5. The method according to claim 1, wherein the second type random access preamble satisfies a formula $N_{DFT}=f_s*T_{SEQ}$, where $N_{DFT}$ denotes a Discrete Fourier Transform (DFT) size, $f_s$ denotes a sampling frequency, and $T_{SEQ}$ denotes a duration of the second type random access preamble.

6. The method according to claim 1, further comprising:
performing secondary TA adjustment, based on a response of the base station to the transmission of the second type random access preamble.

7. The method according to claim 6, wherein the UE performs only secondary TA adjustment again by transmitting the second type random access preamble when uplink asynchronization occurs due to communication path switching between Line of Sight (LoS) and non-LoS (NLoS).

8. The method according to claim 1, further comprising:
receiving, through Radio Resource Control (RRC) signaling, at least one of a number of transmission times of the first type random access preamble, a number of transmission times of the second type random access preamble and a second type random access preamble transmission periodicity.

9. A user equipment (UE) performing uplink synchronization in a millimeter Wave (mmWave) based wireless communication system, the UE comprising:
a transmitter for transmitting a mmWave signal; and
a processor for controlling the transmitter,
wherein the processor is configured to control the transmitter to repeatedly transmit a first type random access preamble through a plurality of coarse beams sequentially formed in different directions, to perform primary TA adjustment, based on a response of a base station to the repeated transmission of the first type random access preamble and to transmit a second type random access preamble through at least one fine beam having a smaller beam width than the coarse beams, and
wherein a sequence of the second type random access preamble transmitted after the primary TA adjustment is configured to be shorter than a sequence of the first type random access preamble in a time domain.

10. The UE according to claim 9, wherein the first type random access preamble is transmitted in a unit of a subframe, and the second type random access preamble is transmitted in a unit of a predetermined symbol.

11. The UE according to claim 9,
wherein the sequence of the second type random access preamble has a longer duration than a maximum channel delay spread of a mmWave in the time domain, and
wherein a sum of durations of the second type random access preamble, a guard time (GT) and a cyclic prefix (CP) are set to be equal to or shorter than a duration of 2 symbols.

12. The UE according to claim 9, wherein spacing of subcarriers in which the second type random access preamble is transmitted is set to a reciprocal of a duration of the second type random access preamble.

13. The UE according to claim 9, wherein the second type random access preamble satisfies a formula $N_{DFT}=f_s*T_{SEQ}$, where $N_{DFT}$ denotes a Discrete Fourier Transform (DFT) size, $f_s$ denotes a sampling frequency, and $T_{SEQ}$ denotes a duration of the second type random access preamble.

14. The UE according to claim 9, wherein secondary TA adjustment is performed, based on a response of the base station to the transmission of the second type random access preamble.

15. The UE according to claim 14, wherein the processor performs only the secondary TA adjustment again by transmitting the second type random access preamble when uplink asynchronization occurs due to communication path switching between Line of Sight (LoS) and non-LoS (NLoS).

16. The UE according to claim 9, further comprising:
a receiver for receiving, through Radio Resource Control (RRC) signaling, at least one of a number of transmission times of the first type random access preamble, a number of transmission times of the second type random access preamble and a second type random access preamble transmission periodicity.

* * * * *